United States Patent [19]

Bishop

[11] Patent Number: 4,699,174
[45] Date of Patent: Oct. 13, 1987

[54] POWER STEERING GEAR ADJUSTING MECHANISM

[76] Inventor: Arthur E. Bishop, P.O. Box 217, Gladesville, Sydney, New South Wales, Australia

[21] Appl. No.: 899,047

[22] Filed: Aug. 22, 1986

[30] Foreign Application Priority Data

Aug. 26, 1985 [AU] Australia .............................. PH02127

[51] Int. Cl.⁴ .......................... F15B 13/04; F15B 9/08
[52] U.S. Cl. .............................. 137/625.24; 91/375 A
[58] Field of Search ................ 91/375 A; 137/625.24; 180/148

[56] References Cited

U.S. PATENT DOCUMENTS

| | | | |
|---|---|---|---|
| 3,145,626 | 8/1964 | Vickers et al. | 137/625.24 X |
| 3,296,940 | 1/1967 | Eddy et al. | 137/625.24 X |
| 4,177,714 | 12/1979 | Schluckebier | 91/375 A |
| 4,449,601 | 5/1984 | Adams | 137/625.24 X |

FOREIGN PATENT DOCUMENTS 2003437 3/1979 United Kingdom ............. 91/375 A

Primary Examiner—Gerald A. Michalsky
Attorney, Agent, or Firm—Hill, Van Santen, Steadman & Simpson

[57] ABSTRACT

A means of adjusting the angular relationship between an input shaft and a torsion bar extending coaxially through the input shaft in the hydraulic valve of a power steering gear which consists of a pin extending through transverse radially extending aligned holes in the torsion bar on the input shaft the pin and the holes being shaped so that rotation of the pin about its axis causes a limited degree of rotation of the torsion bar relative to the input shaft. A pin is provided with means whereby it can be rotated about its axis and so that it can be fixed in a desired position in relation to the input shaft.

6 Claims, 6 Drawing Figures

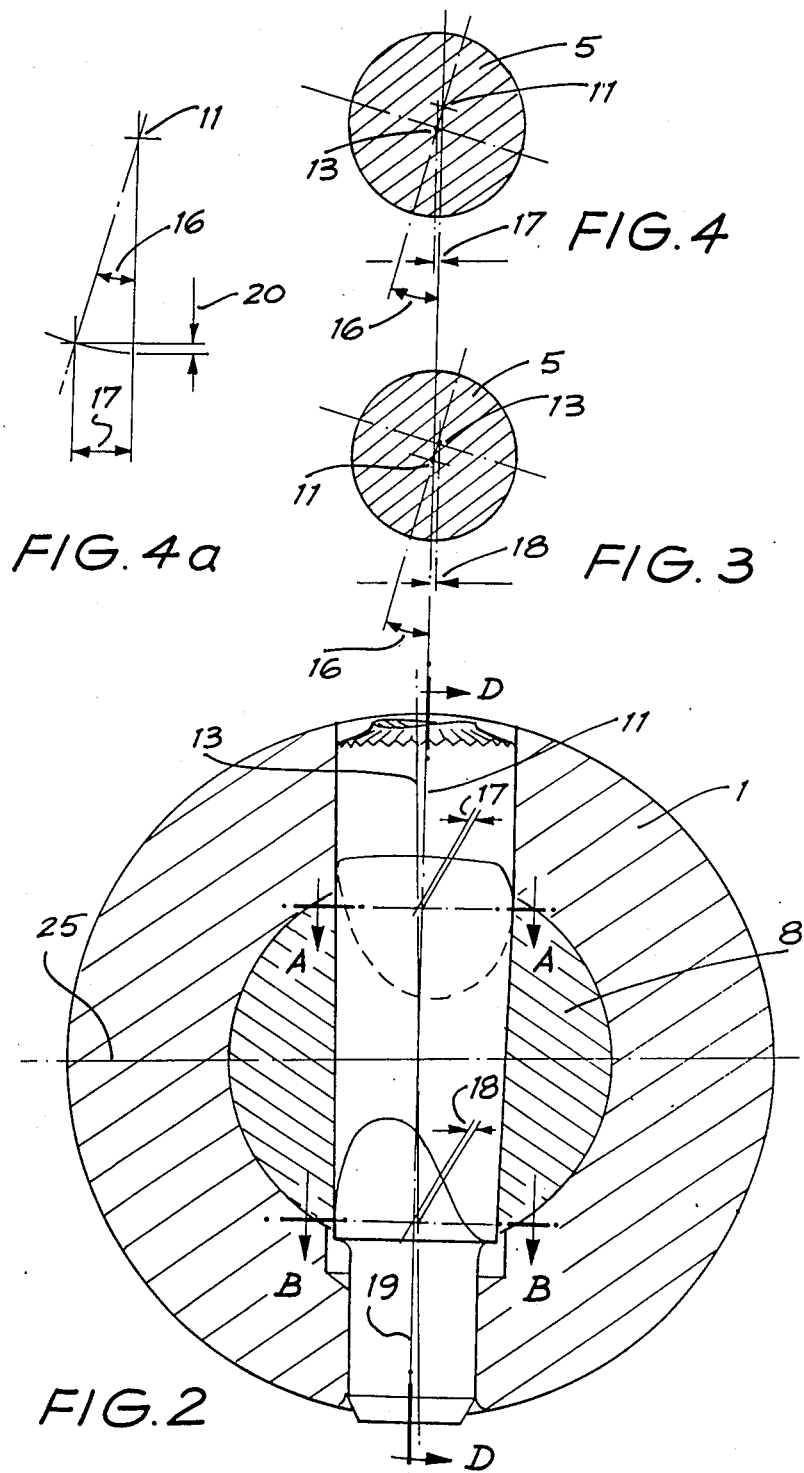

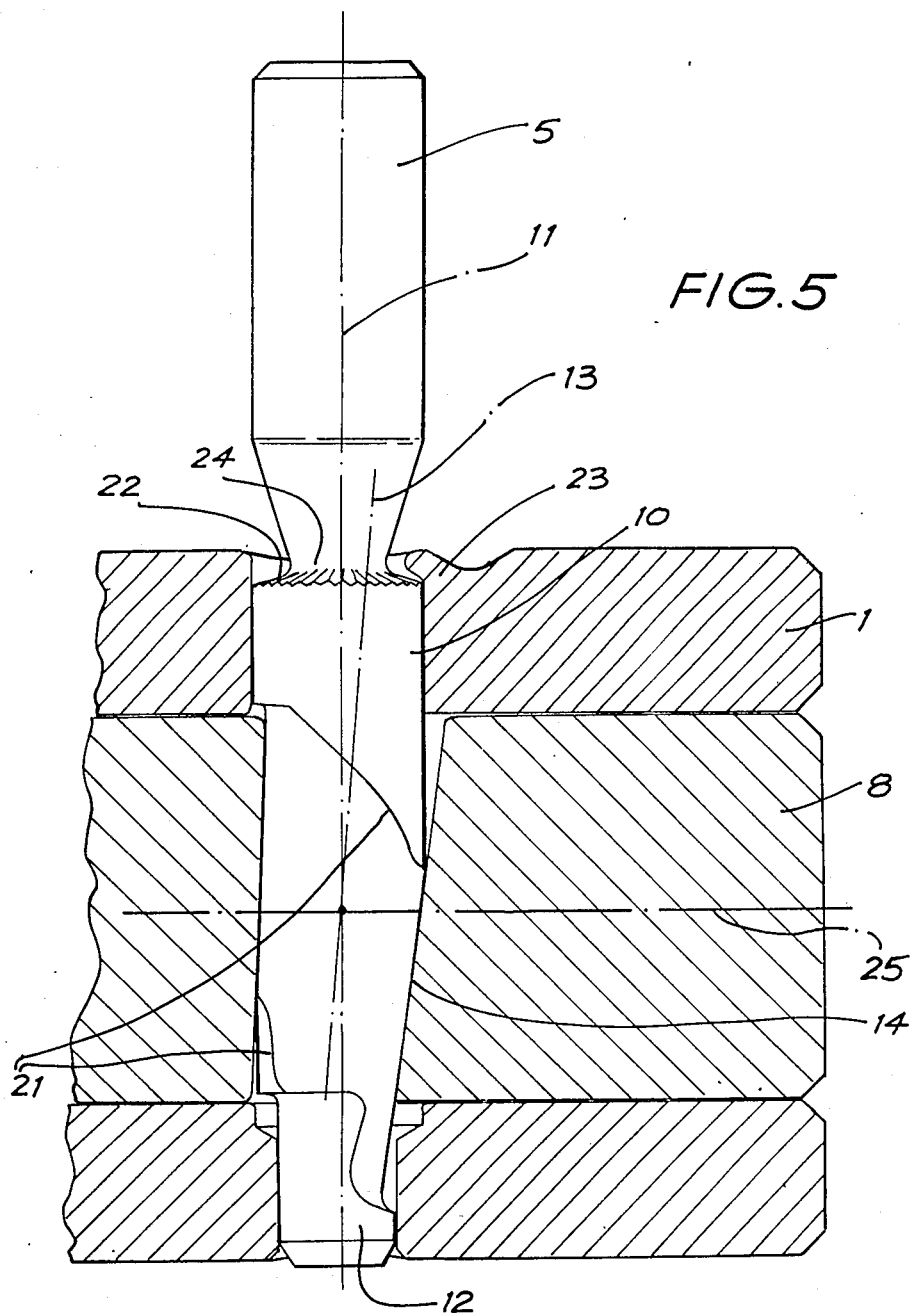

POWER STEERING GEAR ADJUSTING MECHANISM

This invention relates to power steering gears for motor vehicles, and in particular to the rotary valves used in such gears.

The commonly used design of such valves employs an input shaft/valve member which extends upwardly from the steering gear assembly and is connected by a flexible coupling to the steering wheel shaft. For this purpose, the extended end of the input shaft is usually externally splined.

The steering gear assembly is provided with a valve housing concentric with the input shaft containing a sleeve member journalled on the input shaft.

The input shaft extends through the sleeve and is journalled on a rotatable first steering gear member which, for a rack and pinion steering gear, is the pinion.

The valve sleeve is arranged to be driven in a slack-free manner by a pin extending radially from the pinion. The downwardly-extending end of the input shaft is splined in a loose-fitting manner to the pinion so allowing limited relative rotation between the input shaft and the pinion, and hence also between the input shaft and the sleeve.

Both the input shaft and the sleeve member have respectively outwardly and inwardly facing longitudinal chambers formed on their interfacing surfaces which constitute an open centre four way valve operable through angular rotation therebetween.

The sleeve operates within the housing and is provided with several circumferential grooves and seals which allow oil under pressure to be directed to and from an external hydraulic pump and to and from left and right hand assist cylinders in the manner well known in the art. The input shaft and sleeve are normally biased towards a neutral, centered position by a torsion bar secured at its lower end to the pinion, and at its upper end to the input shaft.

It is the means of securing the torsion bar to the upper end of the input shaft which is the subject of this invention.

It is a requirement of operation of a steering gear that the left and right turn operation of the hydraulic assist be as nearly as possible identical, and this symmetry of operation can only be determined at assembly of the steering valve or, preferably, at assembly of the complete steering gear.

Great accuracy is required in determining the exact position of the torsion bar relative to the input shaft to ensure this symmetry and once this position is determined, it must be retained for the life of the steering gear.

According to the most common present practice, the torsion bar is secured to the input shaft by a pin pressed through a hole drilled and reamed through both members during the assembly operation which is performed in a "trimming" machine.

In this machine, both the input shaft and the torsion bar are independently clamped to a drive mechanism capable of making fine angular adjustments of one relative to the other. This whole drive mechanism however, must be capable of being rotated and having precisely determined input torques applied thereto while the resulting pressure in left and right turn cylinders are noted. When precise balance has been achieved, the drive mechanism stops rotating and the entire steering gear assembly and drive mechanism is moved in the "trimming" machine successively into stations or positions where the above-referenced drilling and reaming is performed, and a further station at which a pin is pressed into the hole.

It frequently happens that during these various operations, the precise adjustment is disturbed and it is found on inspection of the completed steering gear or valve assembly that valve operation is no longer symmetrical. This requires that the assembly be extensively reworked at great cost and inconvenience. Furthermore, it is an undesirable feature of this existing method that, on a precise machine such as the trimming machine just described, involving sensing devices for both pressure and input torque, and supplied with carefully monitored flow of oil at regulated pressure and flow, that drilling and reaming operations are carried out with the danger of contaminating the machine system.

Several attempts have been made to solve this problem, and to avoid the scrappage which occurs when asymmetry is detected and to allow the assembly operation to proceed without the contaminating influence of the machining operation. For example, U.S. Pat. No. 3,145,626 (James L. Vickers and Farlow V. Burt) provides that the aforementioned pin connection between the sleeve and the input shaft comprises an eccentric pin having a partspherical head 108. Provision is made to hold the pin securely but rotatably within the input member by a screwthread, and locking is accomplished by providing a nylon insert within the thread. The radially outwardly extending end of the pin formed a spherical manner and engages the tapered slot in an extended end of the sleeve member. At assembly, access is gained to the eccentric pin by a removable plug within the valve-housing, allowing a tool to be inserted so that the pin may be rotated.

This arrangement was found to be unsatisfactory in production as, with repeated reversals of the direction of rotation of the input shaft, as occurs in a steering gear, the nylon locking method proved to be inadequate and adjustment was lost. Furthermore, the need to remove a plug from the housing precluded the possibility of performing the balancing of the valve while oil was flowing through the valve-housing. Thus the plug 112 had to be continually removed and replaced, and the input shaft positioned in a manner that allowed access to the pin through the housing each time an adjustment was made.

These several disadvantages of the prior art are avoided in the present arrangement by a low-cost construction of torsion bar, input shaft and locking pin whereby rotation of the locking pin allows precise relative rotation of the aforementioned items at the assembly operation. According to the invention, when this correct position is found, a light staking operation serves to secure the pin in its correct position and to retain it for the remainder of the life of the steering gear.

Thus, the present invention consists in the provision in a power steering gear of a hydraulic valve having an input shaft and a torsion bar extending coaxially within the input shaft through a bore therein, the torsion bar and the input shaft being connected and held against relative rotary movement by a pin extending through transverse radially extending aligned holes in the torsion bar and the input shaft characterised in that the pin and the holes are shaped so that rotation of the pin about its axis causes a limited degree of rotation of the torsion bar relative to the input shaft, the pin having means whereby it can be rotated about its axis and means being provided whereby the pin can be fixed in a desired position in relation to the input shaft.

The key to the present invention is the use of a pin of a unique geometry to secure the torsion bar to the input shaft at final assembly.

This geometry is such that rotation of the pin about its axis rotates the torsion bar relative to the input shaft through an angle typically of about plus or minus 2 degrees. The corresponding rotation of the pin is about plus or minus 20 degrees giving a vernier effect.

The part of the pin which engages the torsion bar is tapered, providing a slack-free connection. Provision is made to permanently secure the pin in its correct position by staking. The pin has two coaxial cylindrical sections, one of larger diameter than the other, separated by a tapered section whose axis is inclined to that of the cylindrical sections. These two axes intersect at a point which is close to the longitudinal axis of the input shaft. The pin, as initially installed, projects radially from the input shaft so that it can be gripped for rotation. Normally this rotational adjustment will be performed in a "trimming" machine where the assembled valve is rotated alternately in opposite directions while oil is flowed through the assembly. The pinion is secured against rotation. The pressure in left and right turn rotations of the input shaft is observed and the pin adjusted until symmetry is obtained. The protruding end of the pin is broken off or cut off and the pin is staked to retain its position.

The use of this pin enables the shaft and torsion bar to be finish-machined prior to arriving at final assembly and no machining is required at that operation. The importance of this in respect to the torsion bar is that it may be made of a suitable material and heat-treated without regard to the ability to drill and ream at assembly. Thus a high-grade spring steel hardened and tempered to approximately Rockwell 50 may be employed whereas, under the present practice, a lower alloy steel is used hardened to about Rockwell 35. This means that a much higher endurance fatigue limit is achieved, so that a far stiffer torsion bar may be used. This is an important factor in achieving optimum performance of certain new types of steering gears.

The invention will be better understood by reference to the attached drawings, in which:

FIG. 2 is a section through CC of FIG. 1.

FIG. 3 is a section through BB of FIG. 2.

FIG. 4 is a part section through AA of FIG. 2.

FIG. 4a is a diagram showing, on are enlarged scale, the central portion of FIG. 4.

FIG. 5 is a part section through DD of FIG. 2.

Figure 1:
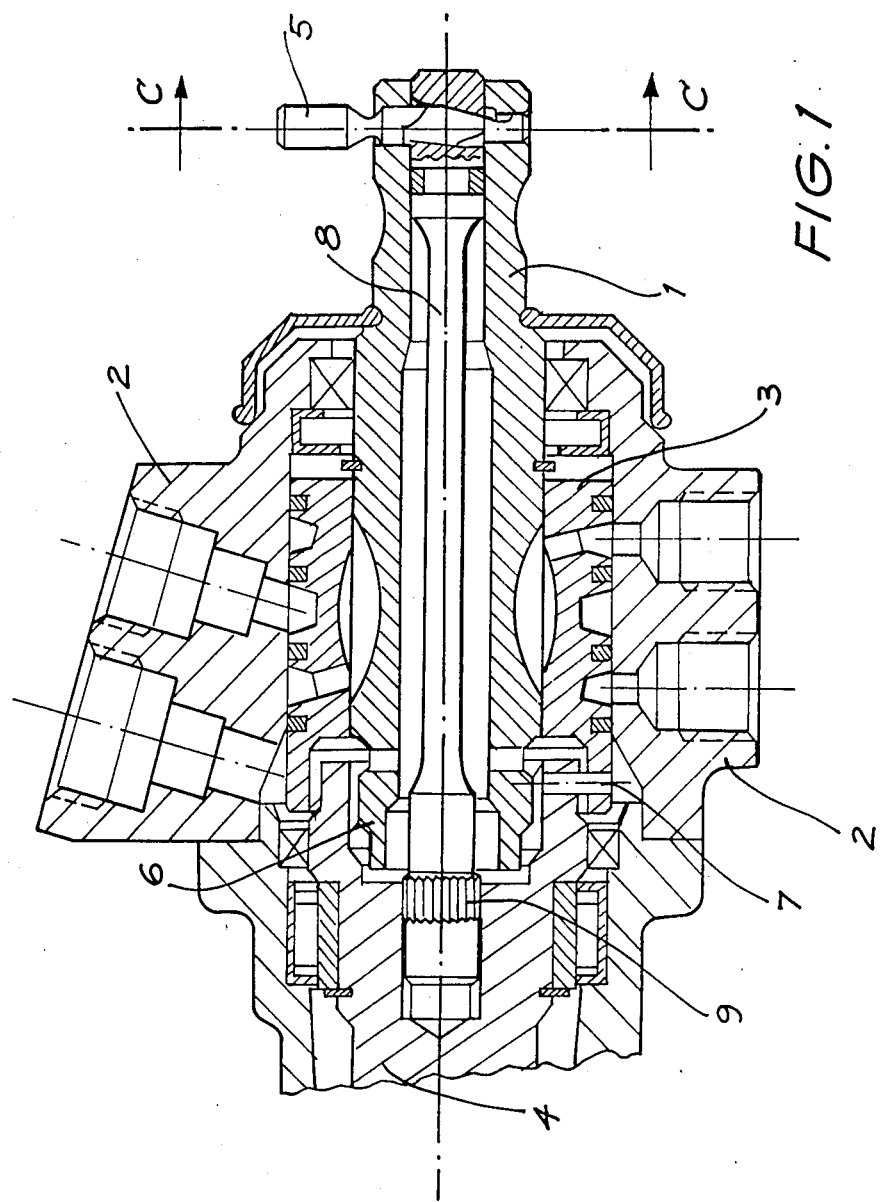
FIG. 1 is a section through a typical steering valve embodying the invention.

Referring now to FIG. 1, input shaft 1 is carried in housing 2 and has journalled thereon sleeve 3. The manner in which the input shaft and sleeve operate to direct oil to and from the hydraulic pump and to and from the assist cylinders is well known in the art and will not further be described here. The lower end of input shaft 1 is journalled in pinion 4 as at 6. Sleeve drive pin 7 protruding from the pinion engages a slot in sleeve 3 to provide a slack-free connection between the sleeve and the pinion. Torsion bar 8 is firmly connected to pinion 4 in some convenient manner, for instance by serrating and pressing into the pinion as illustrated at 9. The torsion bar 8 and input shaft 1 are united by pin 5 which also serves to adjust the angular relationship therebetween.

The precise geometry of pin 5 will be apparent from FIGS. 2, 3, 4 and 5. Thus in FIG. 5 it will be seen that pin 5 has a large parallel diameter 10 concentric with axis 11 and a small parallel diameter 12 also coaxial with 11. Positioned between these parallel diameters is a tapered section 14 having its axis 13 inclined about 5 degrees to axis 11. The included angle of the taper may be about 6 degrees. In the position shown in FIG. 5, the pin has been slightly rotated clockwise about its axis 11 through some small angle 16, as may be seen in FIGS. 3 and 4. This will result in a shift of axis 13 as seen respectively in section AA and BB (FIGS. 4 and 3) to the left and right by amounts 17 and 18.

Now, as stated earlier, axes 11 and 13 intersect close to the valve axis 25 and it follows that, if sections AA and BB are equally remote from 18, then amounts 17 and 18 will be equal.

Thus the torsion bar 8 will have been rotated through some small angle 19, typically about 1.5 degrees.

Of course, counter-clockwise rotation of pin 5 would have produced a rotation of the torsion bar 8 opposite to that shown.

It will be appreciated that, as seen in enlarged view FIG. 4a, as axis 13 moves to the left by the amount 17, it will also move up some very small amount 20. For the figures quoted above, the resulting rotation of torsion bar 8 in FIG. 5 counter-clockwise about the intersection of axes 11 and 13 will be about 10 minutes of arc. Such a small deflection will readily be accommodated in the clearance between input shaft 1 and torsion bar 8. However, to ensure that no binding will occur, the wash-out of the parallel diameter of pin 5, as indicated at 21 will reduce the stiffness of the connection between torsion bar 8 and input shaft 1, as seen in FIG. 5 without impairing the torsional stiffness of the connection as seen in FIG. 2.

When the correct position of pin 5 is obtained, it will be retained in this position by staking as at 23. Preferably a groove is provided in pin 5 as at 24 which is serrated as at 22. Pin 5 is thus secured against axial movement or rotation.

Pin 5 is now broken off where is has been 'necked down' as at 24.

It will be recognised by persons skilled in the art that numerous variations and modifications may be made to the invention as described above without departing from the spirit or scope of the invention as hereinafter claimed.

I claim:

1. In a power steering gear including a hydraulic valve having an input shaft and a torsion bar extending coaxially within the input shaft through a bore therein, the torsion bar and the input shaft being connected and held against relative rotary movement by a pin extending through transverse radially extending aligned holes in the torsion bar and the input shaft characterised in that the pin and the holes are shaped so that rotation of the pin about its axis causes a limited degree of rotation of the torsion bar relative to the input shaft, the pin having means whereby it can be rotated about its axis and means being provided whereby the pin can be fixed in a desired position in relation to the input shaft.

2. The combination claimed in claim 1, wherein rotation of the pin through 20° in either direction produces a rotation of the torsion bar of the order of 2°.

3. The combination claimed in claim 1 or claim 2, wherein the pin has two coaxial cylindrical portions spaced apart and separated by a truncated conical section and having an axis inclined to that of the first mentioned portions, the axis of the cylindrical portions intersecting the axis of the truncated conical section close to the longitudinal axis of the input shaft, the first mentioned portions fitting closely within holes in the input shaft, and the tapered portion fitting closely within a tapered hole in the torsion bar.

4. The combination claimed in claim 3, wherein the said cylindrical portion near the larger end of the tapered portion is of greater diameter than the cylindrical portion near the smaller end of the tapered portion, the corresponding holes in the input shaft being correspondingly dimensioned.

5. The combination claimed in claim 1, wherein the means whereby the pin can be rotated about its axis consists of an axial extension at one end of the pin connected to the remainder thereof for removal by breaking or cutting after fixing.

6. The combination claimed in claim 1, wherein the means for setting the pin in a desired position consist of a serrated groove in the pin into which a portion of the input shaft can be displaced by staking.

* * * * *